(12) United States Patent
Cox (10) Patent No.: US 7,102,769 B2
(45) Date of Patent: Sep. 5, 2006

(54) DYNAMIC MANAGEMENT AND TRANSMISSIONS OF ERROR NOTIFICATION AND CONFIGURATION DATA FOR PRINTING AND PAPER HANDLING DEVICES

(75) Inventor: Darrell L. Cox, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 676 days.

(21) Appl. No.: 09/809,853

(22) Filed: Mar. 15, 2001

(65) Prior Publication Data

US 2002/0131067 A1 Sep. 19, 2002

(51) Int. Cl.
*G06F 15/00* (2006.01)

(52) U.S. Cl. .................................... 358/1.14; 358/1.15
(58) Field of Classification Search ............... 358/1.1, 358/1.13, 1.14, 1.15, 1.16, 1.6, 1.2, 404, 358/403, 1.8; 710/8, 10, 13–14, 16, 72–74

See application file for complete search history.

(56) References Cited

U.S. PATENT DOCUMENTS 6,621,589 B1 * 9/2003 Al-Kazily et al. ......... 358/1.15

FOREIGN PATENT DOCUMENTS

EP        1035466 A2 *  9/2000

\* cited by examiner

*Primary Examiner*—Arthur G. Evans (57) ABSTRACT

A printer stores management or device configuration data specific to that printer in a memory unit to that printer. The printer then retrieves that data and transmits the data to a printer client device for storage. The printer client device uses the data with a printer driver running on the printer client device to provide appropriate messages (textual and graphic) to indicate an error occurring at the printer or the printer's configuration. A paper handling device connected to the printer may also provide error management and device configuration data to both the printer and the printer client device. In this way, the printer driver need not be prepared, at installation, with all the available error management and device data for all possible combinations of printer and paper handling devices.

29 Claims, 3 Drawing Sheets

DYNAMIC MANAGEMENT AND TRANSMISSIONS OF ERROR NOTIFICATION AND CONFIGURATION DATA FOR PRINTING AND PAPER HANDLING DEVICES

FIELD OF THE INVENTION

The present invention relates to the field of image printing devices and paper handling devices for supplying paper to those image printing devices, such a paper handling device may or may not be integrated in a corresponding image printing device. More particularly, the present invention relates to the error management and configuration data, graphic and textual, that is presented to advise the user of the configuration of and problems with the image printing or paper handling device. Specifically, the present invention provides a dynamic means of uploading the error management and/or configuration data to the image printing device or printer client device from the image printing device or paper handling device.

BACKGROUND OF THE INVENTION

With modern computers running software packages for word processing, desktop publishing, graphic design or computer aided design, a user can create a vast array of documents for a variety of purposes. Once these documents are created, it is generally necessary or desirable to print a hardcopy of the work. For this purpose, sophisticated printing devices have been developed that can accept the data generated by a computer and print the desired document.

As used herein, the term "printer" will be used generically to refer to all such image printing devices that receive data from a computerized system and render or print that data to a print medium, such as a sheet of paper. Consequently, the term "printer" includes, but is not limited to, laser printers, inkjet printers, dot-matrix printers, facsimile machines, digital copiers, plotters, and the like. The term "printer" also includes image printing devices which transfer an optical image to a printing drum for replication, e.g. a photographic or xerographic copier.

As used herein, the term "printer client" will be used generically to refer to all computerized systems that transmit image data to a printer from which the printer generates a printed image. Consequently, the term "printer client" includes, but is not limited to, a personal computer, a laptop, a server, a scanner, a modem, or the like. A printer client may also be referred to as a host.

Most printers have devices integrated therein for handling the most likely print medium, paper. These paper handling devices grab individual sheets of paper from a paper supply or tray and move the paper along a transport path through the printer so that the image specified by the data received from the printer client can be rendered by the printer on the paper. Some printers, for reasons such as high speed and large volume, require larger, more robust and sophisticated paper handling devices which are built as a separate unit and then functionally connected to the printer. This paper handling device may be a device for feeding paper to the printer, or a device for collating, sorting, etc., the output of the printer. As used herein, the term "paper handling device" will refer to such a paper handling device which is built as a separate unit and which is functionally connected to a printer to handle paper input to, or output from, that printer.

Generally, in order for a printer client to be able to send image data to a printer, the printer client must have software known as a printer driver. The printer driver provides the functionality required to translate the image data resident on the printer client to data that can be transmitted to and used by the printer to print the corresponding image. Generally, each printer or class of printers has a unique printer driver which must be installed on the printer client before the client can make use of the printer.

The printer driver may also include error management features that assist a user to identify and correct errors with the printer. For example, the printer may signal an error such as a paper jam, lack of paper, depleted supply of toner, etc. This signal is interpreted by the printer driver and an appropriate message is displayed on the monitor of the printer client. In some cases, the message may prompt the printer client to access a bitmap image of the printer. This bitmap is stored on the printer client and installed as part of the printer driver on the printer client. When an error message arrives from the printer, the printer driver can use the bitmap image to display a graphic illustrating the printer and show where the error, such as a paper jam, has occurred so that the error can be more readily corrected.

The same applies to a paper handling device used with the printer. The driver installed on the printer client may also translate error messages and provide appropriate text and graphics to alert a user to the existence and nature of a problem in the paper handling device.

Consequently, when a driver is installed on a printer client, the driver must be customizable to account for any possible printer configuration and printer/paper handling device combination, including having appropriate graphics for illustrating error locations and correction instructions. As a result, the driver must incorporate a large amount of data to be adaptable to any printer/paper handling device combination. Moreover, any time a printer or paper handling device is replaced or changed, the driver must be reinstalled to match the new configuration.

This problem can be exacerbated if the printer and paper handling devices are made by different manufacturers. In such a case, it may be difficult for the printer manufacturer, who typically supplies the driver software, to obtain the error management data, particularly graphic data, for the paper handling device so that the driver can be designed to fully support textual and graphical error management data received from the paper handling device.

Therefore, there is a need in the art for an improved system and method of distributing and dynamically managing error management data for a printer or a printer/paper handling device combination so that the printer driver provided with the printer can be more generalized and requires less error management data at the time of installation.

SUMMARY OF THE INVENTION

The present invention provides a new system and method of distributing and dynamically managing error management and/or device configuration data for a printer or a printer/paper handling device combination. Consequently, the printer driver provided with the printer can be more generalized and requires less error management and device configuration data at the time of installation.

The present invention may be embodied and described as a printer for use with a printing system that includes at least one printer client. The printer of the present invention preferably includes an internal memory device, where error management and/or device configuration data related to the printer may be stored in that internal memory device; and a processor for retrieving the error management data and device configuration data from the internal memory device and transmitting the data to the printer client for use with a printer driver running on the printer client.

The present invention may also be embodied and described as a printing system having a novel system for managing error management and/or device configuration data used by the printing system. More specifically, the printing system preferably includes a printer having an internal memory device, where error management and device configuration data related to that printer may be stored in that internal memory device, and a processor in said printer for accessing the error management or device configuration data and transmitting that error management or device configuration data from the printer directly or indirectly to a printer client device.

The printing system of the present invention also preferably includes the printer client device which is connected to the printer and has a printer driver running thereon. The error management data may be transmitted from the printer to the printer client for use by the printer driver.

Preferably, the error management data includes at least one electronic image file representing an illustration of the printer for use in an error message displayed by the printer client device. This electronic image file may be, for example, a bitmap file or a vector diagram of the printer. Additionally, the printer may have its own display device on which an error message is displayed using the error management data stored in the printer upon the occurrence of an error in the printer.

The system may also include a paper handling device functionally connected to the printer. According to the present invention, the paper handling device includes a second internal memory device in which additional error management data related to the paper handling device is stored. The additional error management data preferably includes at least one electronic image file representing an illustration of the paper handling device for use in an error message displayed by the printer client device. This electronic image file may be, for example, a bitmap file or a vector diagram.

The paper handling device transmits the additional error management data to the printer. The printer, in turn, transmits the additional error management data from the paper handling device to the printer client device. In this way, the printer client obtains the error management data for the printer and paper handling device combination without needing to have all such possible data available initially.

The present invention also encompasses the methods of making and operating the system described above. For example, the present invention encompasses a method of managing error management data in a printing system by storing error management data related to a printer in an internal memory device of that printer. The method further includes transmitting the error management data from the printer to a printer client device for use by a printer driver running on the printer client device. Finally, the method of the present invention includes storing additional error management data related to a paper handling device functionally connected to the printer in a second internal memory device in that paper handling device; and transmitting that additional error management data from the paper handling device to the printer and, ultimately, to the printer client.

The present invention also encompasses the computer-readable instructions required to cause the printing system to operate in the manner and according to the method described above. Specifically, the present invention includes computer-readable instructions stored in media for recording computer-readable instructions, the computer-readable instructions causing the printer of a printing system to retrieve error management data related to that printer, which error management data is stored in an internal memory device of that printer, and transmit that error management data to a printer client.

The computer-readable instructions of the present invention are also partially incorporated in a printer driver for a printer client and cause the printer driver to receive the error management data and use the error management data in the user interface of the driver for alerting the user to a printer error occurring at the printer.

The computer-readable instructions of the present invention also cause a paper handling device of the printing system to retrieve additional error management data related to that paper handling device, which additional error management data is stored in an internal memory device of that paper handling device, and transmit that additional error management data to the printer or to the printer client. This additional error management data is likewise used in the user interface of the printer driver of the printer client when an error occurs at the paper handling device.

The present invention may also encompass a printer for use with a printing system that includes one or more printer client devices. The printer includes an internal memory device, wherein error management data or device configuration data related to said printer is stored in said internal memory device; a processor for retrieving said data from said memory device; and a display device on said printer for displaying error management or device configuration information based on the retrieved data.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

According to the principles of the present invention, error management information, particularly graphical error management data, and/or graphical device configuration data is stored in a printer and, perhaps, in a paper handling device for use with that printer. When the printer or a printer/paper handling device combination are connected to a printer client or a system that includes a printer client, the error management and/or device configuration data that is specific to that printer/paper handling device combination is retrieved from memory units in the printer and paper handling device, respectively, and uploaded to the printer client for use by the printer driver running on that printer client.

Figure 1:
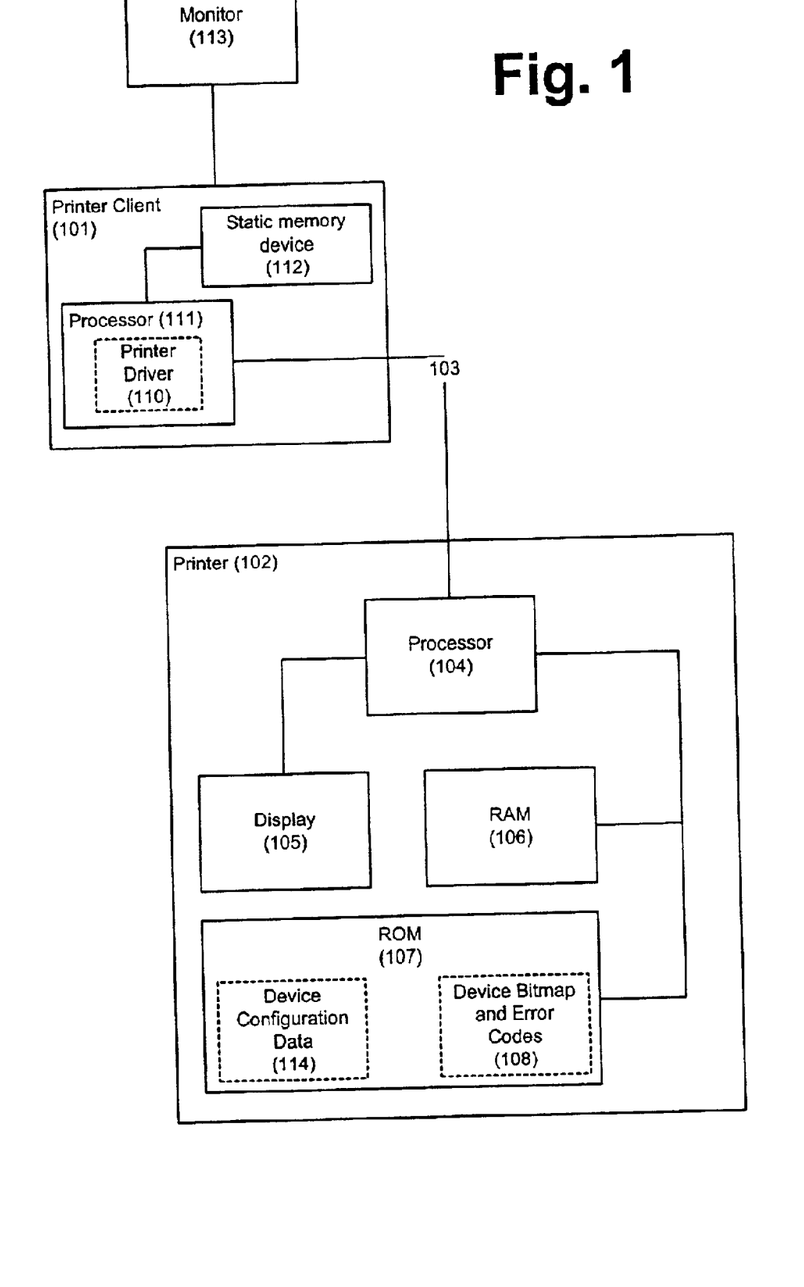
FIG. 1 is a block diagram of a printer and printer client according to a first embodiment of the present invention.

Using the drawings, the preferred embodiments of the present invention will now be explained. FIG. 1 illustrates a system in which a representative printer client (101) is connected to a printer (102). The connection (103) between the client (101) and the printer (102) may be, for example, a parallel input/output connection, an Ethernet link or the like. The connection (103) may be part of a Local Area Network (LAN) or wide area network (WAN).

The printer client (101) has a printer driver (110) installed and running thereon. The printer driver (110), once installed on the printer client (101), can be stored on a static memory device (112), for example, a hard drive or floppy disk drive. When the printer client (101) is booted or needs to send a print job to the printer (102), the processor (111) of the printer client (101) can retrieve the driver (110) from the memory device (112), load it to RAM (Random Access Memory) (not shown) and execute the driver (110). The driver (110) can then be used to send print jobs from the client (101) to the printer (102).

However, the driver (110) need not, as installed, contain the error management data, textual and graphic, or graphical device configuration data for the printer (102). Rather, the error management and/or the device configuration data is stored in a ROM (Read Only Memory) unit (107) in the printer (102)

As used herein, "error management data" shall be read to include the information necessary to provide and display textual and graphic messages that indicate errors or problems experienced by the printer (102) and/or an associated paper handling device. Preferably, the "error management data" also includes a an electronic image file that can be displayed on a display device, such as a monitor (103) of the printer client (101), to illustrate the printer (102) and/or an associated paper handling device for the purpose of explaining or locating a problem being experienced by the printer/paper handling system. This electronic image file may be, for example, a bitmap file or a vector diagram. The displayed image may also provide instructions for correcting the problem.

By way of example, "error management data" may include an error code that can be transmitted by the printer (102) when the printer (102) has no paper, and a user interface of the driver (110) that responds to the error code by displaying a message on the monitor (113) of the printer client (101) that advises the user that the printer (102) requires paper. The "error management data" may include an electronic image file, such as a bitmap or vector diagram, which is a graphic illustration of the internal paper transport path of the printer (102). Again, an error code (also part of the "error management data") that specifies the existence and location of a paper jam may be transmitted by the printer (102) to the client (101). The user interface of the driver (110) responds by displaying the illustration of the printer (102) on the monitor (113) with an indication on the illustration as to where the paper jam is located. The illustration may also provide textual or animated elements that advise the user how to clear the indicated paper jam.

As used herein, "device configuration data" shall be read to include the information necessary to provide and display textual and graphic messages that illustrate the internal configuration of the printer or paper handling device. By way of example, a printer or paper handling device may contain a number of paper trays from which different sizes, colors or types of paper may be taken for use by the printer. The device configuration data may include a graphical illustration showing the various paper trays available so that the user can specify from which tray, i.e., what type of paper, is to be used for the print job. This data may also be used in conjunction with an "out of paper" error message to indicate which paper tray is empty.

The printer (102) includes a processor (104) with associated RAM (106) and ROM (107). As used herein, the term "processor" may refer to a microprocessor, a controller, a micro-controller, an application specific integrated circuit (ASIC) or any other data processing device for controlling the operation of that device.

The ROM (107) preferably stores the software or programming executed by the processor (104) in controlling the operation of the printer (102). This programming is loaded into RAM (106) when the printer (102) is started and is executed from there by the processor (104).

The ROM (107) also stores the error management data (108), such as error codes and image files, and/or the device configuration data (114), such as device configuration image files, that are specific to that printer (102). This data can be loaded by the processor (104) and used to display error messages, graphic and textual, or device configuration maps on a display device (105) located on the printer (102).

This displayed error message or device configuration data may be the same messages or types of message described above as displayed on the monitor (113) of the client (101). For example, the processor (104) may display on the display device (105) a graphic illustration of the internal paper transport path of the printer and an indication of where a paper jam has occurred. The illustration may also include instructions for clearing the jam. Alternatively, the illustration may display the configuration of the printer to, for example, allow for selection of paper from a particular tray.

When the printer (102) is initially connected to system (103) or is called by the client (101), the processor (104) retrieves the error management data (108) and/or the device configuration data (114) from the ROM (107) and uploads the data (108, 114) to the client (101). The client (101) can then store the data (108, 114) on the static memory device (112) for use by the printer driver (110).

Consequently, the driver (110), when installed, need not include the error management or device configuration data for any particular printer. Thus, the driver (110) can be generalized to communicate with a number of different printers or printer types and receive the error management and/or device configuration data for each such printer directly from that printer. The system only needs a common command or protocol for transferring the error management data (108) and device configuration data (114) from the printer's ROM (107) to the client (101). This command or protocol can take any number of forms under the principles of the present invention as will be clear to those skilled in the art.

Figure 2:
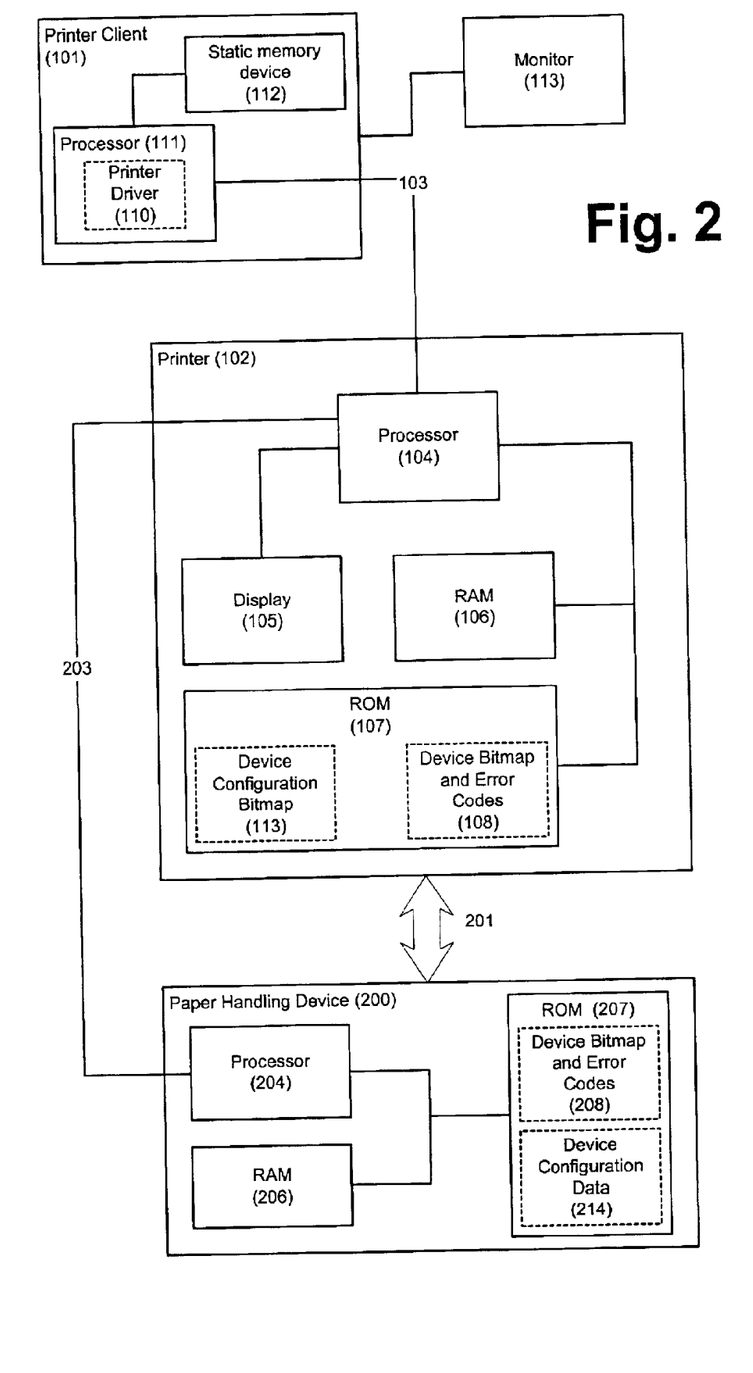
FIG. 2 is a block diagram of a printer, paper handling device and printer client according to a second embodiment of the present invention.

FIG. 2 illustrates a system identical to that of FIG. 1 with the addition of a paper handling device (200). In the Figures, identical elements are indicated with identical reference numbers. Consequently, a redundant explanation will be omitted of those devices and elements described above.

As shown in FIG. 2, the printer (102) is functionally connected with a paper handling device (200). In other words, a paper transport path (201) exists between the printer (102) and the paper handling device (200). The paper handling device (200) may be an input device for inputting paper to the printer (102), or may be an output device for managing (e.g., collating, sorting, stapling, etc.) paper output by the printer (102).

Similar to the printer (102), the paper handling device (200) includes a processor (204) which loads programming from ROM (207) to RAM (206). The processor (204) then executes that programming in order to control the operation of the paper handling device (200).

As before, the ROM (207) of the paper handling device (200) contains error management data (208) and/or device configuration data (214) specific to that paper handling device (200). As before, the error management data (108) includes error codes and image files that provide information required to allow the user interface of the driver (110) or the printer (102) to display a textual and/or graphic indication of an error that has occurred in the paper handling device (200). Similarly, the device configuration data (214) includes data and image files that illustrate the configuration, such as the number and arrangement of paper trays, of the paper handling device (200).

When the paper handling device (200) is initially connected to the printer (102) or called by the printer (102), the processor (204) of the paper handling device (200) retrieves the error management data (208) and/or the device configuration data (214) from the ROM (207) and transmits the data (208, 214) to the printer (102). The printer (102) may store this data (208, 214) in static memory. The printer (102) also uploads the data (208, 214) to the client (101). As before, the client stores the data (208, 214) in static memory (112) for use by the printer driver (110).

In this way, the driver (110), as provided to the client (101), need not be equipped to handle error management messages from, or provide configuration data for, every possible combination of printer and paper handling device. Rather, that error management and device configuration data is provided dynamically from the devices themselves (102, 200) as they are connected to each other and the client system (101, 103). The command or protocol mentioned above for triggering and managing the data transfer from the printer (102) to the client (101) can obviously be extended to include the transmission of the error management data (208) and/or device configuration data (214) from the paper handling device (200) to the printer (102) and, ultimately, the client (101). The connection (203) between the paper handling device (200) and the printer (102) is preferably a communications link such as, but not limited to, a C-link, JetLink or the like.

Figure 3:
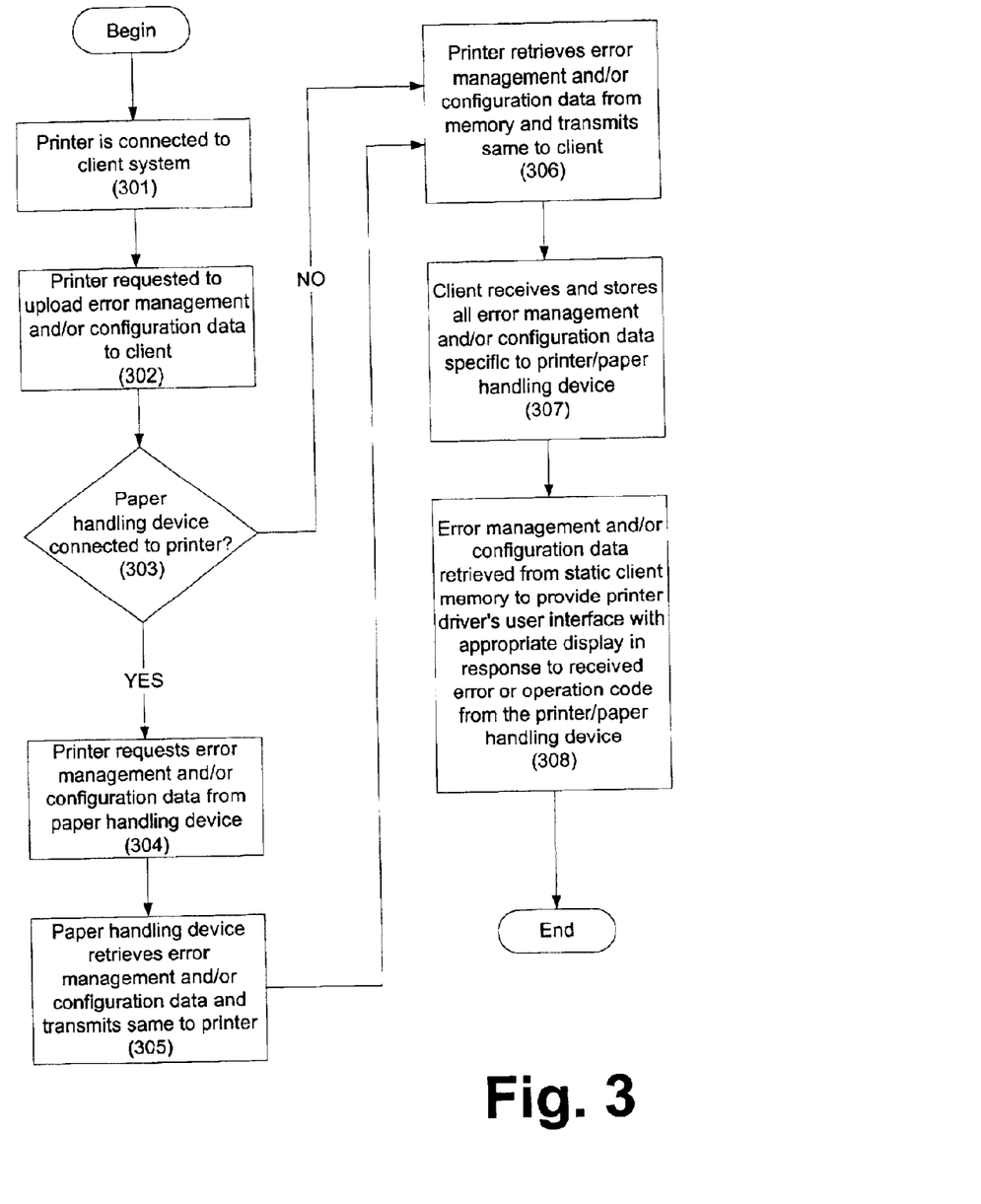
FIG. 3 is a flowchart illustrating the method and the operation of the software of the present invention.

FIG. 3 illustrates in flowchart form the method of the present invention. As shown in FIG. 3, the procedure begins when a printer (with or without an associated paper handling device) is connected to the client system (301). At some point, the printer is requested to provide its error management and/or device configuration data to the client system (302). This request may occur automatically when the printer is first connected to the client system and the printer driver is installed in the printer client. Alternatively, the driver on the printer client may transmit a request to the printer for the printer's error management and/or device configuration data at any time the driver needs to access that information and does not find it available in the client's static memory.

The printer may then determine if a paper handling device is connected to the printer (303). If so, the printer may send a request to the paper handling device for the error management data and/or device configuration data specific to that paper handling device (304). The paper handling device (305) accordingly responds and retrieves and transmits the requested error management and/or device configuration data to the printer (305).

Once the printer has obtained the error management and/or device configuration data from the paper handling device, or if no paper handling device is connected to the printer, the printer retrieves its own error management and/or device configuration data from memory and transmits all the data collected to the printer client (306). The error management and/or device configuration data is then stored by the client in static memory (307). During operation, if an error code is received by the printer driver running on the printer client, the driver accesses the error management data in static memory and uses that data to display an appropriate message (textual and/or graphical) to the user to indicate the presence of an error or problem with the printer/paper handling system (308). Similarly, if the printer driver needs to display the configuration of the printer and/or the paper handling device to advise the user of a problem or illicit user input, such as which tray from which to pull paper for a particular print job, the driver accesses the device configuration data in static memory and uses that data to display an appropriate message (textual and/or graphical) to the user to illustrate the configuration of the printer/paper handling system.

The present invention also encompasses computer-readable instructions necessary to cause the printer client, printer and paper handling device to function in the manner described above. As used herein, the term "computer-readable instructions" encompasses software, i.e., computer code, written in any language and at any level (e.g., source code, object code, etc.) as well as firmware, including, but not limited to, ASICs and the like.

Specifically, the present invention encompasses computer-readable instructions that cause the printer and paper handling device to access error management and/or device configuration data from internal memory devices and transmit that data, ultimately to the printer client system as described above. The present invention further encompasses computer-readable instructions incorporated into a printer driver on a printer client device that cause the printer driver to receive and store the error management and/or device configuration data from the printer and paper handling device and to use that data in a user interface to display appropriate error messages and, preferably, correction instructions (textual and graphic) for the user, or device configuration messages (textual or graphic) for the user.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A printing system comprising a system for managing error management data used by said printing system, the printing system comprising:
   a printer having an internal memory device, where error management data related to said printer is stored in said internal memory device; and
   a processor in said printer for accessing said error management data and transmitting said error management data from said printer directly or indirectly to a printer client device.

2. A printing system comprising a system for managing error management and device configuration data used by said printing system, the printing system comprising:
   a printer having an internal memory device, where error management or device configuration data related to said printer is stored in said internal memory device;

a processor in said printer for accessing said error management or device configuration data and transmitting said error management or device configuration data from said printer to a printer client device; and said printer client device connected to said printer, said printer client device comprising a printer driver;

wherein said data stored in said internal memory device is transmitted from said printer to said printer client device for use by said printer driver.

3. The system of claim 1, wherein said error management data comprises at least one image file representing an illustration of said printer for use in an error message displayed by said printer client device.

4. A printing system comprising a system for managing device configuration data used by said printing system, the printing system comprising:

a printer having an internal memory device, where device configuration data related to said printer is stored in said internal memory device; and a processor in said printer for accessing said device configuration data and transmitting said device configuration data from said printer to a printer client device;

wherein said device configuration data comprises at least one image file representing an illustration of a configuration of said printer.

5. The system of claim 1, wherein said printer further comprises a display device on which an error message is displayed using said error management data upon an occurrence of an error in said printer.

6. A printing system comprising a system for managing error management and device configuration data used by said printing system, the printing system comprising:

a printer having an internal memory device, where error management or device configuration data related to said printer is stored in said internal memory device;

a processor in said printer for accessing said error management or device configuration data and transmitting said error management or device configuration data from said printer to a printer client device; and a paper handling device functionally connected to said printer, wherein said paper handling device includes a second internal memory device, where additional error management or device configuration data related to said paper handling device is stored in said second internal memory device.

7. The system of claim 6, wherein said additional data comprises additional error management data comprising least one image file representing an illustration of said paper handling device for use in an error message displayed by said printer client device.

8. The system of claim 6, wherein said additional data comprises additional device configuration data comprising at least one image file representing an illustration of a configuration of said paper handling device.

9. The system of claim 6, wherein said paper handling device transmits said additional data to said printer.

10. The system of claim 9, wherein said printer further transmits said additional data from said paper handling device to said printer client device.

11. A method of managing error management data data in a printing system, the method comprising storing error management data related to a printer in an internal memory device of that printer.

12. A method of managing error management data or device configuration data in a printing system, the method comprising:

storing error management data or device configuration data related to a printer in an internal memory device of that printer; and transmitting said data from said printer to a printer client device for use by a printer driver running on said printer client device.

13. The method of claim 11, further comprising transmitting with said error management data at least one image file representing an illustration of said printer for use in an error message displayed by said printer client device.

14. A method of managing device configuration data in a printing system, the method comprising:

storing device configuration data related to a printer in an internal memory device of that printer;

wherein said data comprises at least one image file representing an illustration of a configuration of said printer.

15. A method of managing error management data or device configuration data in a printing system, the method comprising:

storing error management data or device configuration data related to a printer in an internal memory device of that printer; and storing additional error management or device configuration data related to a paper handling device functionally connected to said printer in a second internal memory device in that paper handling device.

16. The method of claim 15, further comprising transmitting said additional data from said paper handling device to said printer.

17. The method of claim 16, further comprising transmitting said additional data to a printer client device.

18. Computer-readable instructions stored in media for recording computer-readable instructions, said computer-readable instructions causing a printer of a printing system to retrieve error management data related to that printer, which data is stored in an internal memory device of that printer, and transmit that data to a printer client.

19. Computer-readable instructions stored in media for recording computer-readable instructions, said computer-readable instructions causing a printer of a printing system to retrieve error management or device configuration data related to that printer, which data is stored in an internal memory device of that printer, and transmit that data to a printer client;

wherein said instructions are partially incorporated in a printer driver of said printer client, said instructions causing said printer driver to use said data from said printer in a user interface of said printer driver.

20. Computer-readable instructions stored in media for recording computer-readable instructions, said computer-readable instructions causing a printer of a printing system to retrieve error management or device configuration data related to that printer, which data is stored in an internal memory device of that printer, and transmit that data to a printer client;

said instructions further causing a paper handling device of said printing system to retrieve additional error management or device configuration data related to that paper handling device, which additional data is stored in an internal memory device of that paper handling device, and transmit that additional data to said printer client.

21. The instructions of claim 20, partially incorporated in a printer driver of said printer client, said instructions causing said printer driver to use said data from said printer and paper handling device in a user interface of said printer driver.

22. A printer for use with a printing system comprising at least one printer client, said printer comprising:
- an internal memory device, wherein error management data or device configuration data related to said printer is stored in said internal memory device;
- a processor for retrieving said data from said memory device; and
- a display device on said printer for displaying error management or device configuration information based on said retrieved data.

23. The printer of claim 22, wherein said data comprises error management data comprising at least one image file representing an illustration of said printer for use in an error message displayed on said display device.

24. The printer of claim 22, wherein said data comprises device configuration data comprising at least one image file representing an illustration of a configuration of said printer for use in a configuration message displayed on said display device.

25. The printer of claim 22, further comprising a paper handling device functionally connected to said printer, wherein said paper handling device includes a second internal memory device, where additional error management or device configuration data related to said paper handling device is stored in said second internal memory device.

26. The printer of claim 25, wherein said additional data comprises additional error management data comprising least one image file representing an illustration of said paper handling device for use in an error message displayed by said display device.

27. The printer of claim 25, wherein said additional data comprises additional device configuration data comprising at least one image file representing an illustration of a configuration of said paper handling device for use in a configuration message displayed by said display device.

28. The system of claim 6, wherein said paper handling device transmits said additional data to said printer client device.

29. The method of claim 15, further comprising transmitting any of said data to a printer client device.

* * * * *

UNITED STATES PATENT AND TRADEMARK OFFICE
CERTIFICATE OF CORRECTION

PATENT NO. : 7,102,769 B2
APPLICATION NO. : 09/809853
DATED : September 5, 2006
INVENTOR(S) : Darrell L. Cox It is certified that error appears in the above-identified patent and that said Letters Patent is hereby corrected as shown below:

Title Pg, Item (57), under "ABSTRACT", in column 2, line 1, after "stores" insert -- errors --.

Title Pg, Item (57), under "ABSTRACT", in column 2, line 2, after "unit" insert -- internal --.

In column 1, line 48, delete "modern" and insert -- modem --, therefor.

In column 9, line 52, in Claim 7, delete "least" and insert -- at least --, therefor.

In column 9, line 64, in Claim 11, after "management data" delete "data".

In column 12, line 10, in Claim 26, delete "least" and insert -- at least --, therefor.

Signed and Sealed this

Eleventh Day of August, 2009

David J. Kappos
*Director of the United States Patent and Trademark Office*